United States Patent
Chen et al.

(10) Patent No.: US 8,861,825 B2
(45) Date of Patent: Oct. 14, 2014

(54) METHOD FOR ASSISTING IN DETERMINING STRENGTH OF FIXING CRANIOFACIAL SURGERY PATCH AND COMPUTER USING THE SAME

(75) Inventors: Shou-I Chen, Hsinchu (TW);
Sheng-Chuan Wang, Hsinchu (TW);
Hung-Ta Hsiao, Hsinchu (TW);
Lung-Cheng Lee, Hsinchu (TW);
Ming-Hsiao Lee, Hsinchu (TW);
Chih-Min Yao, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 464 days.

(21) Appl. No.: 13/347,933

(22) Filed: Jan. 11, 2012

(65) Prior Publication Data
US 2013/0103375 A1    Apr. 25, 2013

(30) Foreign Application Priority Data

Oct. 19, 2011    (TW) .............................. 100137980 A

(51) Int. Cl.
*G06K 9/00*    (2006.01)
*G06T 19/00*    (2011.01)
(52) U.S. Cl.
CPC ..................................... *G06T 19/00* (2013.01)
USPC .............................. 382/131; 606/285; 602/17

(58) Field of Classification Search
USPC .................... 703/11; 382/100, 128–132, 199; 606/285; 602/17
See application file for complete search history.

(56) References Cited

U.S. PATENT DOCUMENTS

| | | | |
|---|---|---|---|
| 6,879,712 B2 * | 4/2005 | Tuncay et al. ................. | 382/128 |
| 7,953,260 B2 * | 5/2011 | Weinzweig et al. ........... | 382/128 |
| 2002/0035458 A1 * | 3/2002 | Kim et al. .......................... | 703/6 |
| 2003/0065259 A1 * | 4/2003 | Gateno et al. ................. | 600/425 |

\* cited by examiner

*Primary Examiner* — Shefali Goradia
(74) *Attorney, Agent, or Firm* — Morris Manning & Martin LLP; Tim Tingkang Xia, Esq.

(57) ABSTRACT

A computer for assisting in determining the strength of fixing a craniofacial surgery patch comprises a storage device for storing a medical image and a central processing unit, the central processing unit carry out a method for assisting in determining the strength of fixing a craniofacial surgery patch. The method includes obtaining a medical image; establishing a skull model according to the medical image; receiving a patch setting command, and disposing a patch model on the skull model according to the patch setting command; generating an internal grid mesh data of the skull model disposed with the patch model; executing a biomechanical simulation of a patch structural strength according to the skull model disposed with the patch model, the internal grid mesh data and a boundary condition; and providing a stress distribution, a strain distribution or a displacement distribution of the patch model to assist in determining.

18 Claims, 6 Drawing Sheets

METHOD FOR ASSISTING IN DETERMINING STRENGTH OF FIXING CRANIOFACIAL SURGERY PATCH AND COMPUTER USING THE SAME

CROSS-REFERENCE TO RELATED APPLICATIONS

This non-provisional application claims priority under 35 U.S.C. §119(a) on Patent Application No(s). 100137980 filed in Taiwan, R.O.C. on Oct. 19, 2011, the entire contents of which are hereby incorporated by reference.

BACKGROUND

1. Technical Field

The disclosure relates to an assisting method and computer using the method and more particularly to a method and using the method computer for assisting in determining the strength of fixing a craniofacial surgery patch.

2. Related Art

Patients with facial or craniofacial damages, or brain lesions caused by accidents require craniotomy or cosmetic surgery. After craniofacial surgery is conducted, the bone flaps taken out previously or artificial bone flaps required by orthopedics need to be put back and fixed appropriately. Clinically, the fixing position and the fixing method for each bone flap are different because the size and shape of a damaged area after surgery are different. Bone flap placed back after a surgery may get loosed or subsided because of weak fixing strength, and it will not only affect the appearance but will also jeopardize the function of patches protecting a skull.

With respect to biomedical mechanics simulation and analysis as well as simulation of implanted objects in surgery, the geometry of human anatomy is rather complicated, and the geometry is difficult to be structurally analyzed. Therefore, it is not possible to carry out simulation for procedures of real surgery, and difficult to perform evaluation before surgery. Doctors can only rely on personal experiences to determine fixing method of bone flaps and possible risks before conducting craniofacial surgery. It is not only a burden for doctors, but patients' safety is not assured as well.

SUMMARY

According to an embodiment, a computer for assisting in determining the strength of fixing a craniofacial surgery patch comprises a storage device for storing a medical image and a central processing unit, and the central processing unit is capable of carrying out a method for assisting in determining the strength of fixing a craniofacial surgery patch. The method for assisting in determining the strength of fixing a craniofacial surgery patch includes obtaining a medical image; establishing a skull model according to the medical image; receiving a patch setting command, and disposing a patch model on the skull model according to the patch setting command; generating an internal grid mesh data of the skull model with the patch model; executing a biomechanical simulation of a patch structural strength according to the skull model with the patch model with the boundary condition, for obtaining a stress distribution, a strain distribution or a displacement distribution of the patch model; and providing the stress distribution, the strain distribution or the displacement distribution of the patch model to assist in determining for user.

In some embodiments, the medical image is a file of digital imaging and communications in medicine (DICOM). In some embodiments, the medical image is obtained according to computed tomography (CT) scanning of the skull. In some embodiments, step of establishing a skull model according to the medical image includes processing the medical image with a threshold segmentation procedure to obtain a skull image partition; and establishing the skull model corresponding to the skull image partition by a marching cubes algorithm. In some embodiments, both the skull model and the patch model established are three-dimensional models.

According to an embodiment, the patch model includes a plurality of fixing elements; the patch setting command includes a fixing point number, a fixing point location and a fixing angle of each of the fixing elements. The fixing point number, the fixing point locations and the fixing angles are a plurality of preset values.

In some embodiments, the skull model and the patch model include a plurality of coordinates, each of the coordinates corresponds to a stress value, a strain value and a displacement value. In some embodiments, the method for assisting in determining the strength of fixing a craniofacial surgery patch further includes, sending a warning message when the stress value of any one of the coordinates is larger than a stress threshold value, the strain value of any one of the coordinates is larger than a strain threshold value, or the displacement value of any one of the coordinates is larger than a displacement threshold value. In some embodiments, the boundary condition for the biomechanical simulation of the patch structural strength includes an intracranial pressure and an external loading force.

DETAILED DESCRIPTION

The detailed characteristics and advantages of the disclosure are described in the following embodiments in details, the techniques of the disclosure can be easily understood and embodied by a person of average skill in the art, and the related objects and advantages of the disclosure can be easily understood by a person of average skill in the art by referring to the contents, the claims and the accompanying drawings disclosed in the detailed description.

The disclosure relates to a method for assisting in determining the strength of fixing a craniofacial surgery patch and computer employing such method, they can generate a stress distribution of a skull model disposed with a patch model. The generated stress distribution can assist doctors or medical specialists in determining if a disposition and the strength of fixing the patch model are appropriate before conducting a skull patching surgery.

Figure 1:
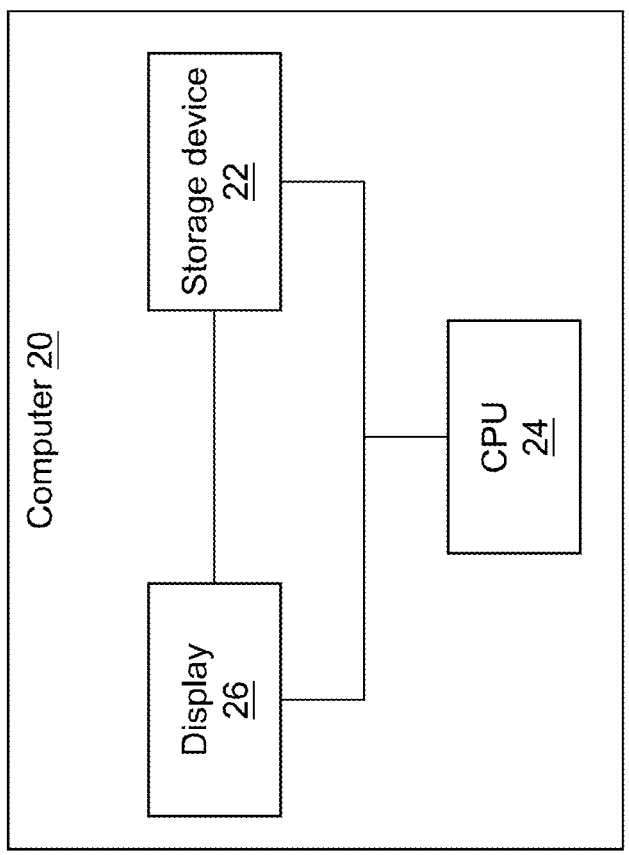
FIG. 1 is an illustration of a computer for assisting in determining the strength of fixing a craniofacial surgery patch of an embodiment of the disclosure.
Figure 2:
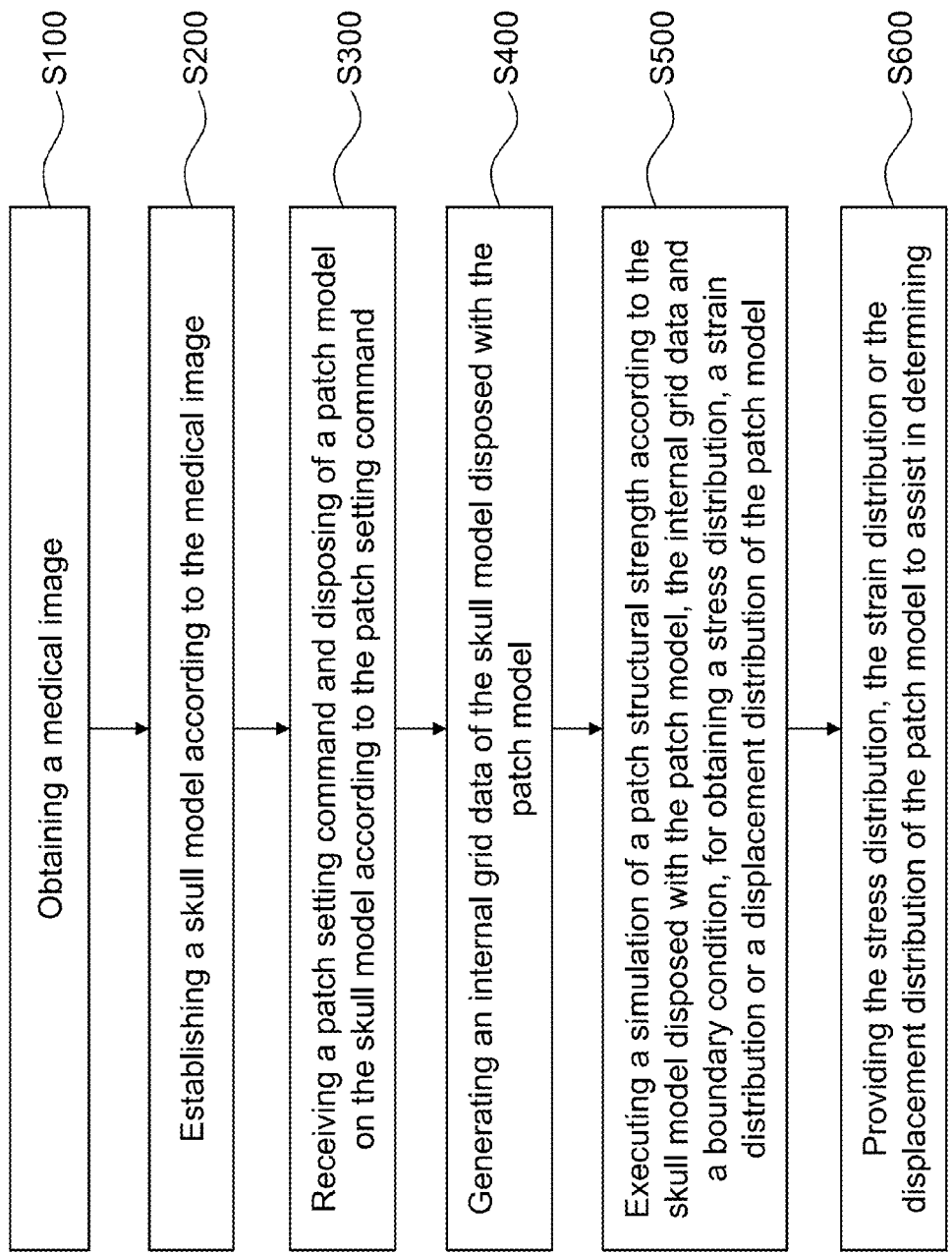
FIG. 2 is a flowchart of a method for assisting in determining the strength of fixing a craniofacial surgery patch of an embodiment of the disclosure.

Referring to FIGS. 1 and 2, they respectively show a block diagram of a computer for assisting in determining the strength of fixing a craniofacial surgery patch, and a flowchart of a method for assisting in determining the strength of fixing a craniofacial surgery patch of an embodiment according to the disclosure. A computer 20 for assisting in determining the strength of fixing a craniofacial surgery patch (for short the computer 20) comprises a storage device 22, a central processing unit 24 and a display 26, and the computer 20 can be a computing device such as a desktop computer, a server or a high speed computer terminal.

Firstly, the central processing unit 24 acquires a medical image of a patient (step S100), the medical image can be a file in digital imaging and communications in medicine (DICOM) format. DICOM is a universal standard protocol used in processing, storage, printing and transferring of medical images. DICOM includes a definition of a file format and an internet communication protocol, which is a TCP/IP based application protocol used in internet to connect or communicate with systems. Between two medical apparatuses, which can receive DICOM format files, images or patient data can be received or exchanged via a DICOM format file. Therefore, medical images in DICOM format can be applied in medical imaging apparatuses, servers, workstations, printers and network devices of various corporations. Medical images can be acquired by computed tomography (CT) scanning of the patients' skull. Medical images can be stored in the storage device 22 as data for output.

Figure 3:
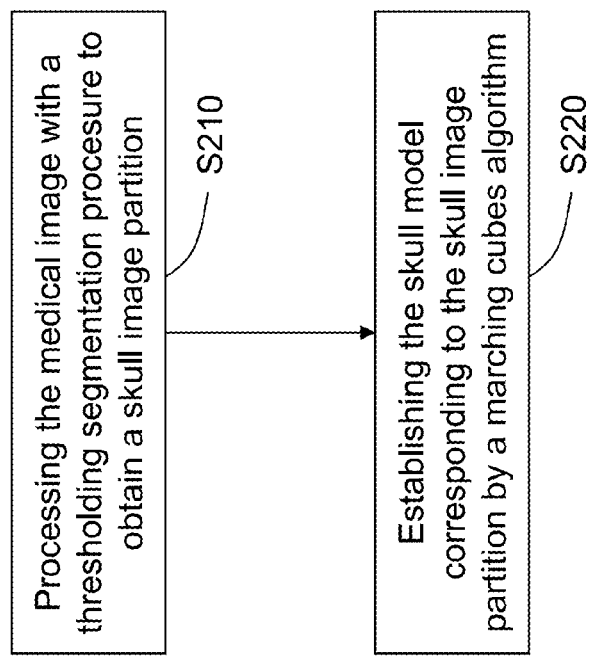
FIG. 3 is a flowchart of a step S200 of an embodiment according to the disclosure.
Figure 4:
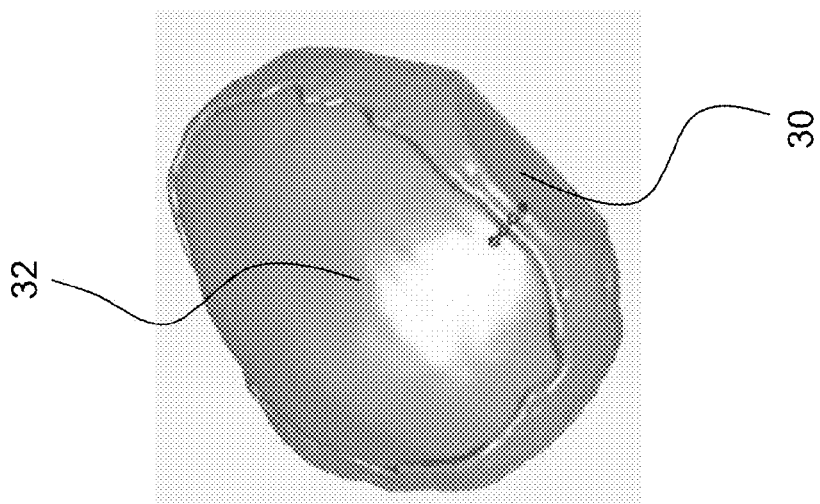
FIG. 4 is an illustration of a skull model of an embodiment of the disclosure.

After the medical image is obtained, a skull model is established according to the medical image (step S200). Please refer to FIG. 3 in conjunction with FIG. 2, which is a flowchart of the step S200 of FIG. 2 of an embodiment. In order to establish the skull model, the medical image is processed with a threshold segmentation procedure to obtain a skull image partition (step S210). The skull image partition is acquired by removing other parts other than the skull image of the original medical image. After the skull image partition is processed with marching cubes algorithm, the skull model corresponding to the skull image partition can then be established (step S220). The skull model established according to the medical image can be a geometry 30 as shown in FIG. 4. The three dimensional skull model 30 can be rotated, zoomed-in and zoomed-out by users for observation.

The central processing unit 24 can load a patch model 32 from the storage device 22, the patch model 32 can also be a geometry. The patch represented by the patch model 32 can be for examples, a bone flap taken out temporarily from a craniofacial surgery, an artificial bone flap for patching a damaged skull of a patient, or an artificial patch required by orthopedics.

Mirror method or sampling method can be used as a technique in skull patching surgery for obtaining the patch model 32. The characteristic of a skull with symmetrical left and right sides is used in the mirror method, by which a shape of the normal skull side is mirrored to a damaged area of the skull defined by a central cross-sectional line; the shape of the normal side can be used as a reference for patching the damaged area. The sampling method is applicable for the damaged area which crosses over the central symmetrical line or for large damaged area; by having data of a normal and complete skull shape overlapping with the damaged area, a geometrical shape of the damaged area can then be segmented. The computer 20 can have both the patch model 32 and the skull model 30 loaded and display for the users via a graphical user interface (GUI).

In order to dispose the patch model 32 on the skull model 30 according to methods specified by the users, the central processing unit 24 receives a patch setting command via the GUI, and have the patch model 32 disposed on the skull model 30 according the patch setting command (step S300). The patch model 32 can include a plurality of fixing elements 34, and the patch setting command can include a fixing point number, a fixing point location of each of the fixing elements 34 and a fixing angle of each of the fixing elements 34. The fixing elements 34 can be bone screws or bone plates, and their materials and shapes are not limited here. For examples, they can be straight bone screws or floriated bone plates.

Figure 5:
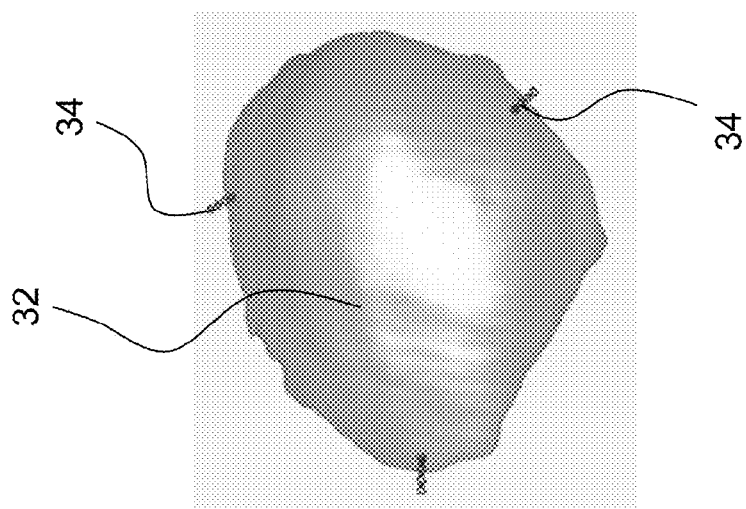
FIG. 5 is an illustration of a patch model of an embodiment of the disclosure.

Referring to FIG. 5, it is an illustration of a patch model of an embodiment. In the embodiment shown in FIG. 5, the GUI only displays the patch model 32, but it can also be displayed with the entire skull model 30, or with parts of the skull model 30 in contact with a surrounding part the patch model 32. The users can simulate the dispositions of the fixing elements 34 in a surgery by specifying parameters of the fixing point location and the fixing angle of each of the fixing elements 34 via the GUI, and carry out a biomechanical simulation of the patch structural strength for different fixing methods in later-staged procedures.

According to an embodiment, the fixing point number, the fixing point locations and the fixing angles can be a plurality of preset values. A computer for assisting in determining the strength of fixing a craniofacial surgery patch can actively provide preset fixing conditions as references for the users. For instance, for the patch model 32 with a large area, three of the fixing elements 34 can be preset to be disposed at an edge of the patch model 32 respectively to form an equilateral triangular shape.

Figure 6:
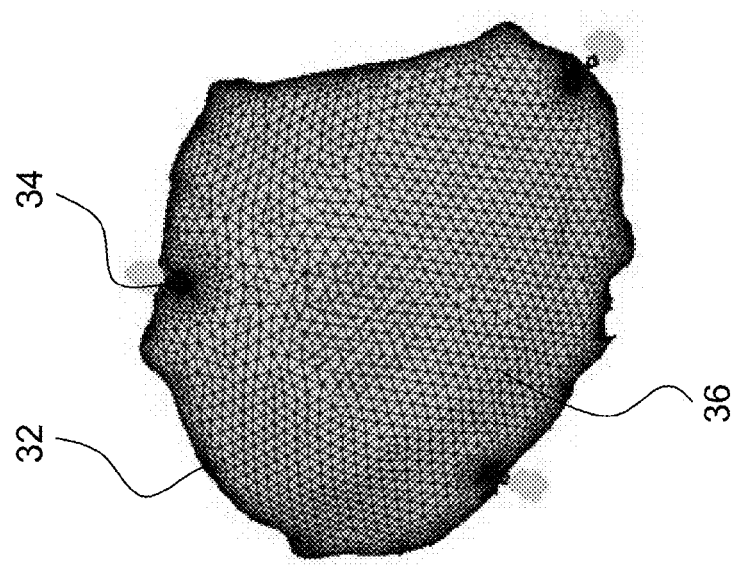
FIG. 6 is an illustration of an internal grid mesh data of an embodiment of the disclosure.

After the patch model 32 and the fixing elements 34 are disposed according to the patch setting command, the central processing unit 24 generates an internal grid mesh data of the skull model 30 with the patch model 32 (step S400). Referring FIG. 6, it is an illustration of an internal grid mesh data of an embodiment.

The internal grid mesh data 36 can be obtained by processing the skull model 30 with a mesh generation software. In order to perform a biomechanical simulation of the patch structural strength according to the objects of the skull model 30, the patch model 32 and the fixing elements 34, data of the objects displayed in space have to be established first. In the step S400, the computer 20 fills the internal grid mesh data 36 into the objects. The internal grid mesh data 36 can include a plurality of grids for filling internals of the objects, and each of the grids corresponds to a coordinate.

Then, the biomechanical simulation of the patch structural strength is performed according to the skull model 30 disposed with the patch model 32, the internal grid mesh data 36 and a boundary condition, in order to obtain a stress distribution, a strain distribution or a displacement distribution of the skull model 30 disposed with the patch model 32 (step S500). The boundary condition can include an intracranial pressure and an external loading force. For examples, the intracranial pressure can be a pressure exerted on the patch model 32 internally, e.g. 10 to 15 mmHg; the external loading force can be an external force exerted on a center of the patch model 32 externally, e.g. 50 Newton. The biomechanical simulation of the patch structural strength is a stress simulation and analysis of mechanics processed with the finite element method, for determining a stress exerted on the internal grid mesh data 36 on each coordinate.

Figure 7:
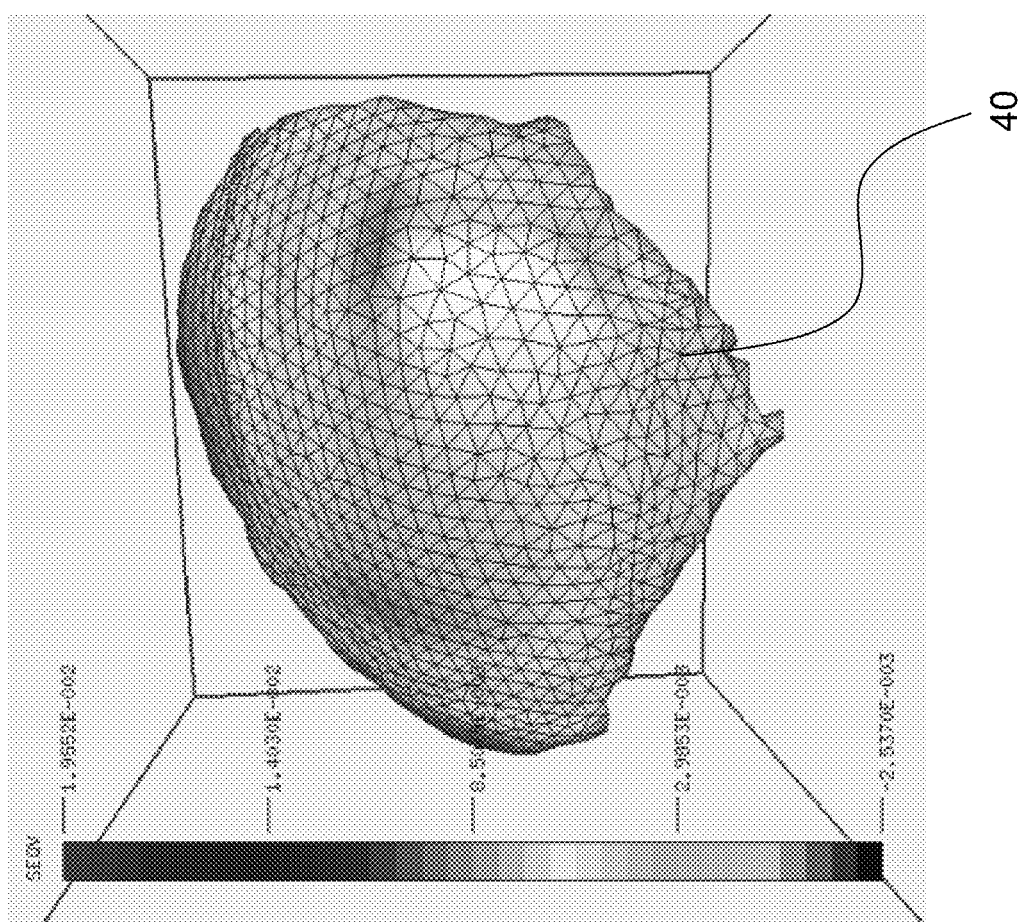
FIG. 7 is an illustration of a stress distribution of an embodiment of the disclosure.
Figure 8:
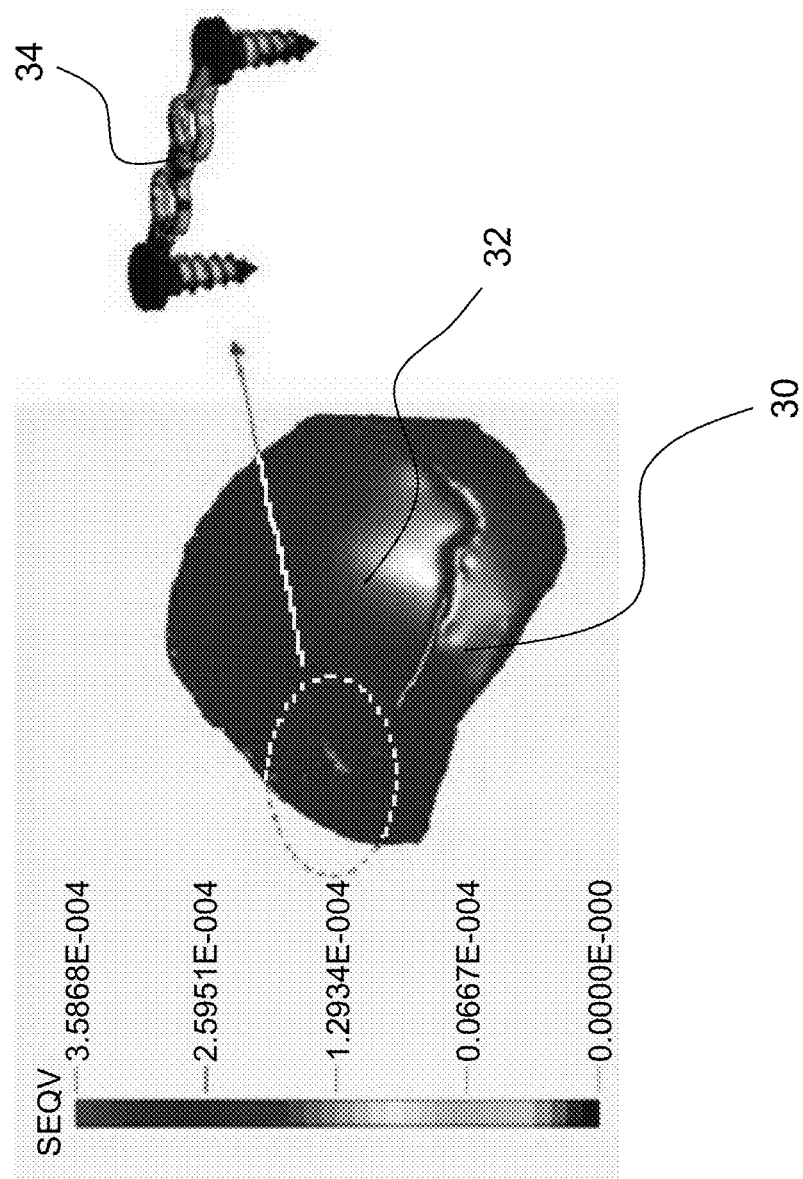
FIG. 8 is an illustration of a stress distribution of an embodiment of the disclosure.

After mechanical analysis and structural analysis are carried out in the biomechanical simulation of the patch structural strength, the stress distribution, the strain distribution or the displacement distribution of the patch model 32 is provided to assist in determining (step S600). Referring to FIG. 7, it is an illustration of a stress distribution of an embodiment. A stress distribution 40 of the patch model 32 can be clearly seen by the users via the GUI, to determine if there is any stress improperly centralized in specific area, which may cause damages to fixing structures due to an external loading force. In some embodiments, the GUI can individually display the stress distribution 40, the stain distribution or the displacement distribution of the skull model 30, the patch model 32 or the fixing elements 34. For example, as shown in FIG. 8, the stress exerted on the skull model 30, the patch model 32 and the fixing elements 34 is fairly average at first glance, but it is shown that the stress exerted on the fixing elements 34 is larger by viewing specifically at the stress distributed on the fixing elements 34 alone. By using this function, doctors can observe the simulation results in details.

Figure 9:
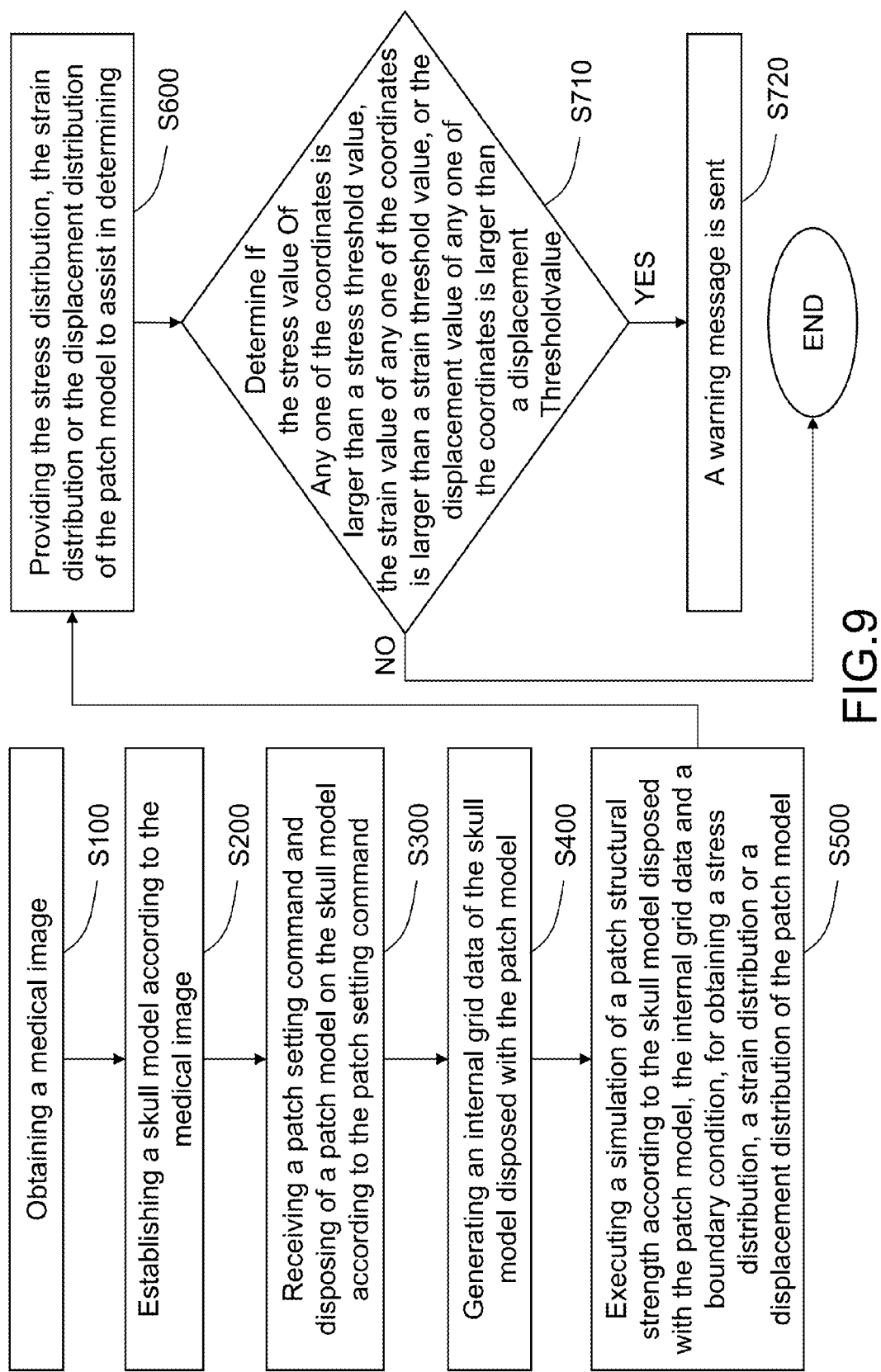
FIG. 9 is a flowchart of a method for assisting in determining the strength of fixing a craniofacial surgery patch of another embodiment of the disclosure.

Referring to FIG. 9, it shows a flowchart of a method for assisting in determining the strength of fixing a craniofacial surgery patch of another embodiment.

The central processing unit 24 can also determine if the stress value of any one of the coordinates is larger than a stress threshold value, the strain value of any one of the coordinates is larger than a strain threshold value, or the displacement value of any one of the coordinates is larger than a displacement threshold value (step S710). When the stress value of any one of the coordinates is larger than the stress threshold value, the strain value of any one of the coordinates is larger than the strain threshold value, or the displacement value of any one of the coordinates is larger than the displacement threshold value, a warning message is sent (step S720) to remind the doctor.

According to yet another embodiment, the process can returned back to the step S300 after the step S600 or the step S720. In other words, return back to the step S300 of disposing the patch model 32 and the fixing elements 34, in order to have the fixing point number, as well as the fixing point locations and the fixing angles of the fixing elements 34 amended, and to perform simulations again for different fixing methods.

A mesh generation software can be integrated in The computer 20 to perform model analysis to generate three dimensional grids, have the grids generated by using tetrahedral elements, then input the patch setting command and the boundary condition into the mesh generation software to solve files which are needed to be solved. The files can be solved by integrating a structure analysis software for structural analyzing in batch mode. The analyzed stress distribution, the stain distribution or the displacement distribution obtained from the solving process can be read in and displayed via the GUI. The mesh generation software can be ANSYS ICEM CFD, and the structure analysis software can be ANSYS. However, the method for assisting in determining the strength of fixing a craniofacial surgery patch does not limit the software being used.

After the stress distribution, the stain distribution or the displacement distribution is provided for the users, later-staged processing tools basically used by general software can also be provided, for the users to view the analyzed results by using a mouse to perform rotation, zoom-in and zoom-out, and for performing cutting planes to display numerical analysis results of internal structures of the skull model 30 and the patch model 32.

As a conclusion from the abovementioned, according to the method for assisting in determining the strength of fixing a craniofacial surgery patch and the computer employing such method, by establishing the skull model based on the medical image, the GUI users are provided with various parameters for disposing and fixing the patch model on the skull model. Biomechanical simulations of the patch structural strength can be performed for the skull model disposed with the patch model as well as the patch model itself, for providing the stress distribution, the stain distribution or the displacement distribution as references for the users, to assist the users in determining if the current fixing methods are appropriate. Therefore, the users can evaluate the structural strength of different fixing methods before conducting a surgery by using the method of the disclosure. By using visual displaying units and amendment of the fixing method for the patch model, thereby a patch disposing method with the most ideal fixing strength can be obtained.

Furthermore, the method of the disclosure has integrated the medical image processing techniques, the analysis procedures of model establishment a well as the finite element analysis and simulation procedures. Thus, the entire surgery simulation and analysis can be carried out. Therefore, the method of the disclosure can solve the problems of difficulties in pre-processing with analysis software and establishing biological geometric grid models, and can reduce the complicated settings for software and the boundary condition.

Note that the specifications relating to the above embodiments should be construed as exemplary rather than as limitative of the disclosure, with many variations and modifications being readily attainable by a person of average skill in the art without departing from the spirit or scope thereof as defined by the appended claims and their legal equivalents.

What is claimed is:

1. A method for assisting in determining the strength of fixing a craniofacial surgery patch, comprising:
    obtaining a medical image;
    establishing a skull model according to the medical image;
    receiving a patch setting command, and disposing of a patch model on the skull model according to the patch setting command;
    generating an internal grid mesh data of the skull model disposed with the patch model;
    executing a biomechanical simulation of a patch structural strength according to the skull model disposed with the patch model with a boundary condition, for receiving a stress distribution, a strain distribution or a displacement distribution of the patch model; and
    providing the stress distribution, the strain distribution or the displacement distribution of the patch model to assist in determining.

2. The method for assisting in determining the strength of fixing a craniofacial surgery patch as claimed in claim 1, wherein the medical image is a file of digital imaging and communications in medicine.

3. The method for assisting in determining the strength of fixing a craniofacial surgery patch as claimed in claim 1, wherein the medical image is obtained according to computed tomography scanning of the skull.

4. The method for assisting in determining the strength of fixing a craniofacial surgery patch as claimed in claim 1, wherein steps of establishing the skull model according to the medical image include:
    processing the medical image with a threshold segmentation procedure to obtain a skull image partition; and
    establishing the skull model corresponding to the skull image partition by a marching cubes algorithm.

5. The method for assisting in determining the strength of fixing a craniofacial surgery patch as claimed in claim 1, wherein the skull model and the patch model are three-dimensional models.

6. The method for assisting in determining the strength of fixing a craniofacial surgery patch as claimed in claim 1, wherein the patch model includes a plurality of fixing elements, the patch setting command includes a fixing point number, a fixing point location and a fixing angle of each of the fixing elements.

7. The method for assisting in determining the strength of fixing a craniofacial surgery patch as claimed in claim 6, wherein the fixing point number, the fixing point locations and the fixing angles are a plurality of preset values.

8. The method for assisting in determining the strength of fixing a craniofacial surgery patch as claimed in claim 1, wherein the boundary condition includes an intracranial pressure and an external loading force.

9. The method for assisting in determining the strength of fixing a craniofacial surgery patch as claimed in claim 1, wherein the skull model and the patch model include a plurality of coordinates, each of the coordinates corresponds to a stress value, a strain value and a displacement value, and the method for assisting in determining the strength of fixing a craniofacial surgery patch further includes:
when the stress value of any one of the coordinates is larger than a stress threshold value, the strain value of any one of the coordinates is larger than a strain threshold value, or the displacement value of any one of the coordinates is larger than a displacement threshold value, a warning message is sent.

10. A computer for assisting in determining the strength of fixing a craniofacial surgery patch, comprising:
a storage device for storing a medical image; and
a central processing unit, executing following steps:
obtaining the medical image;
establishing a skull model according to the medical image;
receiving a patch setting command, and disposing of a patch model on the skull model according to the patch setting command;
generating an internal grid mesh data of the skull model disposed with the patch model;
executing a biomechanical simulation of a patch structural strength according to the skull model disposed with the patch model, the internal grid mesh data and a boundary condition for obtaining a stress distribution, a strain distribution or a displacement distribution of the patch model; and
providing the stress distribution, the strain distribution or the displacement distribution of the patch model to assist in determining.

11. The computer for assisting in determining the strength of fixing a craniofacial surgery patch as claimed in claim 10, wherein the medical image is a file of digital imaging and communications in medicine.

12. The computer for assisting in determining the strength of fixing a craniofacial surgery patch as claimed in claim 10, wherein the medical image is obtained according to computed tomography scanning of the skull.

13. The computer for assisting in determining the strength of fixing a craniofacial surgery patch as claimed in claim 10, wherein steps of establishing the skull model according to the medical image include:
processing the medical image with a threshold segmentation procedure to obtain a skull image partition; and
establishing the skull model corresponding to the skull image partition by a marching cubes algorithm.

14. The computer for assisting in determining the strength of fixing a craniofacial surgery patch as claimed in claim 10, wherein the skull model and the patch model are three-dimensional models.

15. The computer for assisting in determining the strength of fixing a craniofacial surgery patch as claimed in claim 10, wherein the patch model includes a plurality of fixing elements, the patch setting command includes a fixing point number, a fixing point location and a fixing angle of each of the fixing elements.

16. The computer for assisting in determining the strength of fixing a craniofacial surgery patch as claimed in claim 15, wherein the fixing point number, the fixing point locations and the fixing angles are a plurality of preset values.

17. The computer for assisting in determining the strength of fixing a craniofacial surgery patch as claimed in claim 10, wherein the boundary condition includes an intracranial pressure and an external loading force.

18. The computer for assisting in determining the strength of fixing a craniofacial surgery patch as claimed in claim 10, wherein the skull model and the patch model include a plurality of coordinates, each of the coordinates corresponds to a stress value, a strain value and a displacement value, and the central processing unit further executes following steps:
when the stress value of any one of the coordinates is larger than a stress threshold value, the strain value of any one of the coordinates is larger than a strain threshold value, or the displacement value of any one of the coordinates is larger than a displacement threshold value, a warning message is sent.

* * * * *